United States Patent
Hashida

Patent Number: 5,328,151
Date of Patent: Jul. 12, 1994

[54] SOLENOID VALVE

[75] Inventor: Koichi Hashida, Itami, Japan

[73] Assignee: Sumitomo Electric Industries, Ltd., Osaka, Japan

[21] Appl. No.: 26,803

[22] Filed: Mar. 5, 1993

[30] Foreign Application Priority Data

Mar. 6, 1992 [JP] Japan .................. 4-049872

[51] Int. Cl.⁵ ............................................. F16K 31/06
[52] U.S. Cl. ............................. 251/129.15; 251/129.05
[58] Field of Search .............. 251/129.15, 129.05; 137/454.6, 454.2

[56] References Cited

U.S. PATENT DOCUMENTS

| | | | |
|---|---|---|---|
| 4,830,332 | 5/1989 | Miura et al. | 251/129.15 X |
| 4,896,860 | 1/1990 | Malone et al. | 251/129.15 X |
| 4,917,351 | 4/1990 | Lindbloom et al. | 251/129.15 X |
| 5,127,624 | 7/1992 | Domke | 251/129.15 |

FOREIGN PATENT DOCUMENTS 0355055 2/1990 European Pat. Off. .
4003606 12/1990 Fed. Rep. of Germany .

Primary Examiner—Arnold Rosenthal
Attorney, Agent, or Firm—Wenderoth, Lind & Ponack

[57] ABSTRACT

A solenoid valve has a valve seat mounted in a passage for pressure fluid formed in a housing, an armature, and a valve body integral with the armature for opening and closing the valve seat. The armature is moved in a direction to open or close the valve seat by an electromagnetic coil. The solenoid valve is mounted in the housing to enclose the armature liquid-tightly in a pressure fluid chamber defined by the solenoid valve and the housing.

3 Claims, 1 Drawing Sheet

SOLENOID VALVE

BACKGROUND OF THE INVENTION (1) Field of the Invention

This invention relates to a solenoid valve for controlling the flow of pressurized fluid in, e.g., an antilock control device of an automotive brake.

This type of solenoid valve is provided in a pressure oil passage to open and close the passage according to instructions from a computer.

(2) State of the Prior Art

FIG. 2 shows a conventional solenoid valve of this type. It comprises a cylindrical frame 21, a valve seat 23 fitted in a small-diameter hole 22 formed in the upper part of the frame 21, an armature 25 mounted in an intermediate-diameter hole 24 formed in the frame 21 under the small-diameter hole 22, and an electromagnetic coil 27 mounted on the inner wall of a large-diameter hole 26 formed in the frame 21 under the intermediate-diameter hole 24. Also, a sleeve 28 having an inner diameter larger than the diameter of the armature 25 is mounted on the armature in the intermediate-diameter hole 24. A yoke 29 is inserted in the sleeve 28 from its bottom.

The contact portions between the small-diameter hole 22 and the valve seat 23, between the intermediate-diameter hole 24 and the sleeve 28 and the between the sleeve 28 and yoke 29 (designated a, b and c in FIG. 2) are sealed, e.g. by welding. Thus, a pressure oil chamber 31, in which is mounted the armature 25, is sealed except for an inlet/outlet port for pressure oil and a hole 32 formed through the side wall of the frame 21.

The armature 25 is movable up and down in the pressure oil chamber 31 and is urged upwards by a coil spring 45. Thus, the pressure oil inlet/outlet port of the valve seat 23 is normally closed by a valve body 33 provided on the top end of the armature 25.

The frame 21, armature 25 and yoke 29 are made of a magnetic material. These magnetic parts and the electromagnetic coil 27 form a magnetic circuit. When the electromagnetic coil 27 is excited, the armature 25 descends, separating the valve body 33 from the valve seat 23. The pressure oil inlet/outlet port is now opened.

On the other hand, the frame 21 is inserted in a hole 35 formed in a housing 34, which may be a component part of an antilock control device. The yoke 29 is in contact with a housing cover 36. In this way, the solenoid valve is mounted on an antilock control device.

The housing 34 has a first pressure oil inlet/outlet port 37 communicating with the small-diameter hole 22 of the frame 21 and a second pressure oil inlet/outlet port 38 communicating with the hole 32 formed in the frame 21. Thus, a pressure oil passage is formed between the first and second pressure oil inlet/outlet ports 37 and 38, extending through the pressure oil chamber 31. This pressure oil passage is closed while the oil pressure inlet/outlet port of the valve seat 23 is closed. It is opened when the electromagnetic coil 27 is excited and the pressure oil inlet/outlet port of the valve seat 23 opens.

The frame 21 has on the outer peripheral surface thereof two grooves 41 and 42 carrying O-rings 43 and 44, respectively. The O-ring 43 serves to close the fluid communication between the first pressure oil inlet/outlet port 37 and the small-diameter hole 22. The communication between the second pressure oil inlet/outlet port 38 and the hole 32 is closed by both O-rings 43 and 44. The other ring 44 serves to seal the passage between the second pressure oil inlet/outlet port 38 or the hole 32 and the outside.

Another solenoid valve of this type is disclosed in Japanese Unexamined Utility Model Publication 63-99081 filed by the present applicant.

Such conventional solenoid valves require many seals such as seals for portions a), b) and c) and O-rings 43 and 44. Thus, such conventional valves need O-rings for a liquid-tight seal or an additional welding step. Otherwise, a finishing step has to be added so that a sufficiently liquid-tight seal is obtainable simply by press-fitting. This increases the cost and makes it difficult to reduce the size of the valve.

SUMMARY OF THE INVENTION

An object of this invention is to provide a solenoid valve which is simple in structure, small in size and low-cost.

The solenoid valve according to this invention comprises a solenoid valve comprising a solenoid valve body, a valve seat mounted in a passage for pressure fluid formed in a housing, an armature, a valve body integral with the armature for opening and closing a passage through the valve seat, and an electromagnetic coil mounted in the solenoid valve body for moving the armature to open and close the passage through the valve seat. The solenoid valve body is mounted liquid-tight in the housing to enclose the armature so as to define a pressure fluid chamber in which the armature is mounted.

According to the present invention, the valve seat is mounted in the passage for pressure fluid formed in the housing. Thus, there is no need to seal around this passage. What is needed is only to seal the portion where the solenoid valve body is mounted. Further, this portion can be sealed with a single sealing means, such as an O-ring.

Also, since the O-ring for sealing any gap between the frame and the housing serves also for sealing any gap between the frame and the sleeve, there is no need to finish the mating surfaces, so that the gap therebetween can be sealed by press-fitting. Thus, the solenoid valve of this invention is simple in structure and small in size and can be manufactured at low cost.

BRIEF DESCRIPTION OF THE DRAWINGS

Other features and objects of the present invention will become apparent from the following description, made with reference to the accompanying drawings, in which.

DETAILED DESCRIPTION OF THE PREFERRED EMBODIMENT

Figure 1:
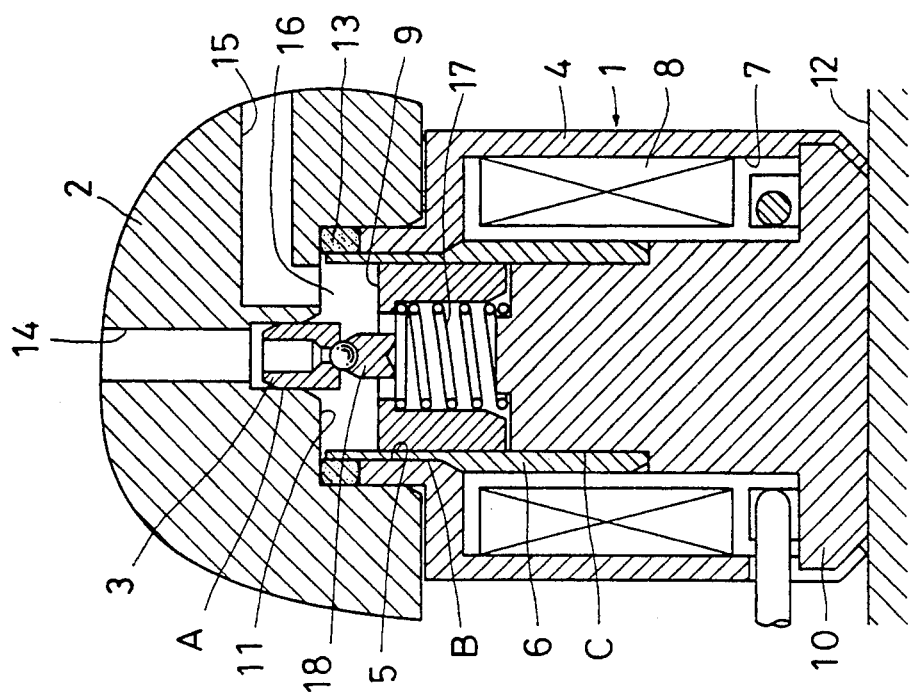
FIG. 1 is a sectional view showing one embodiment of the solenoid valve according to this invention.

Referring to FIG. 1, the solenoid valve of this invention may be used for an antilock control device in a brake system. It comprises a solenoid valve body 1 and a valve seat 3 mounted in a housing 2 of an antilock control device.

The solenoid valve body 1 has a cylindrical frame 4 having an intermediate-diameter hole 5 and a large-diameter hole 7 provided under the intermediate-diameter hole 5. A sleeve 6 is mounted in the intermediate-diameter hole 5. An electromagnetic coil 8 is mounted on the inner wall of the large-diameter hole 7. An armature 9 having an outer diameter slightly smaller than the inner diameter of the sleeve 6 is inserted in the sleeve and the electromagnetic coil 8. A yoke 10 is inserted in the sleeve 6.

The frame 4 is inserted in a hole 11 formed in the housing 2, and the yoke 10 is kept in contact with a housing cover 12. The solenoid valve is thus mounted on the antilock control device.

An O-ring 13 is mounted between the tip of the sleeve 6 and the inner wall of the hole 11 in the housing 2.

On the other hand, the housing 2 has a first pressure oil inlet/outlet port 14 and a second pressure oil inlet/outlet port 15. In the first port 14 is press-fitted the valve seat 3, which forms a solenoid valve in cooperation with the solenoid valve body 1.

By press-fitting the valve seat 3 into the first pressure oil inlet/outlet port 14, a gap A between the valve seat 3 and the pressure oil inlet/outlet port 14 is sealed. Any gap between the sleeve 6 and the yoke 10 (designated as C in the figure) are sealed by welding or press-fitting. Further, any gap between the sleeve 6 and the frame 4 (B in the figure) and any gap between the frame 4 and the housing 2 are sealed by the O-ring 13. Thus, a pressure oil chamber 16, in which is mounted the armature 9, is sealed except for the valve seat 3 mounted in the first pressure oil inlet/outlet port 14 formed in the housing 2 and the second pressure oil inlet/outlet port 15.

Since the armature 9 is biased upwards by a coil spring 17, a pressure oil port formed in the valve seat 3 is normally closed by a valve body 18 provided on the top of the armature 9. A magnetic circuit is formed by the electromagnetic coil 8, frame 4, armature 9 and yoke 10. By exciting the electromagnetic coil 8, the armature 9 descends, separating the valve body 18 from the valve seat 3. The pressure oil port in the valve seat 3 is now opened. Thus, the pressure oil passage comprising the first pressure oil inlet/outlet port 14, the pressure oil chamber 16 and the second pressure oil inlet/outlet port 15 is normally closed, and is opened when the electromagnetic coil 8 is excited.

Although the oil pressure in the pressure oil chamber 16 may increase when opening or closing the valve seat 3, the solenoid valve body 1 will never come off from the housing 2 because the yoke 10 is kept in contact with the housing cover 12.

Figure 2:
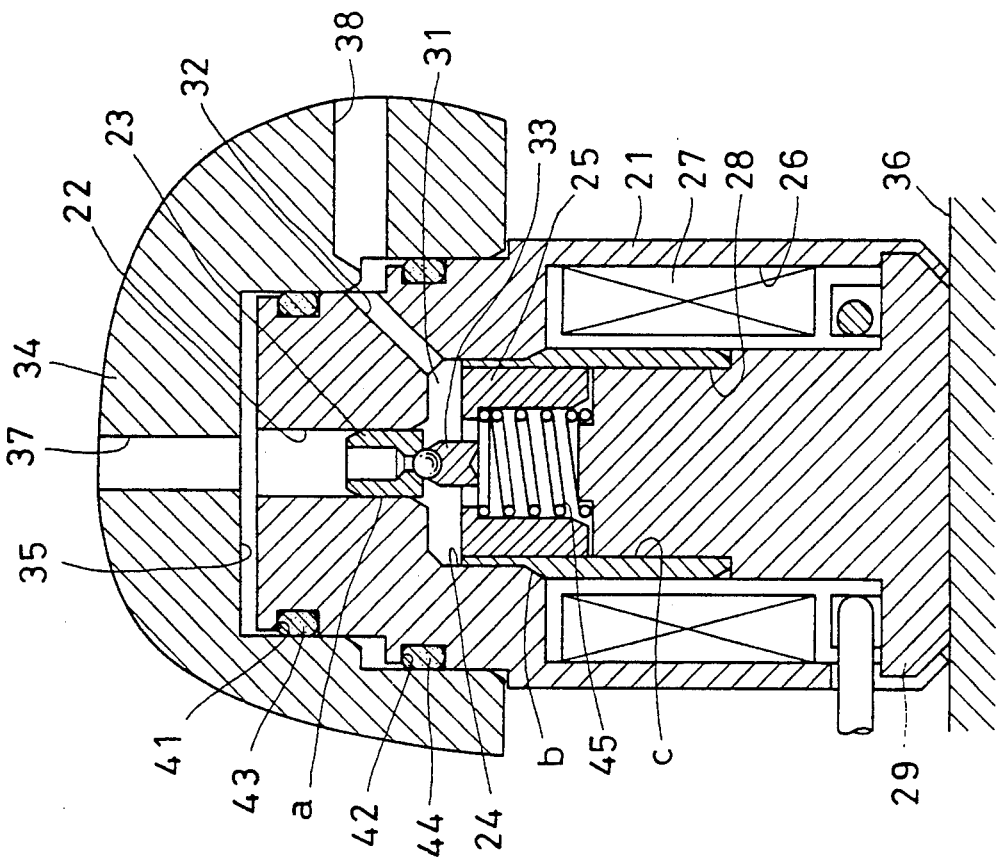
FIG. 2 is a sectional view of a conventional solenoid valve.

With this arrangement, since the valve seat 3 is mounted in the housing 2, there is no need to provide the O-ring 43 as used in the conventional solenoid valve shown in FIG. 2 or any other sealing means for sealing this portion. Thus, as will be readily apparent when one compares the solenoid valve of the embodiment shown in FIG. 1 with the conventional solenoid valve shown in FIG. 2, the solenoid valve of this embodiment is simple in structure and small in size. This invention thus provides a low-cost solenoid valve. Also, according to this invention, the O-ring 43 can be omitted, which was necessary in the conventional solenoid valve shown in FIG. 2. This increases the freedom of layout of the second pressure oil inlet/outlet port 15. For example, it may be provided to extend vertically in juxtaposition with the first pressure oil inlet/outlet port 14.

Further, according to this invention, since the valve seat 3 is not mounted in the frame 4, the minimum inner diameter of the frame 4 is slightly larger than the outer diameter of the armature 9. Thus, the frame 4 can be formed simply by cutting a pipe material having the required minimum inner diameter and a suitable outer diameter. This leads to a further reduction in the production cost.

What is claimed is:

1. A solenoid valve, comprising:
    a housing having an inner periphery and a pressure fluid passage, said pressure fluid passage having an inner end;
    a valve seat fixed to said housing at the inner end of said pressure fluid passage, said valve seat having a passage extending therethrough;
    a frame having a protruding end having a top end face, another end and an inner periphery;
    a sleeve fixedly mounted to the inner periphery of said frame, said sleeve having an outer periphery;
    an armature slidably mounted in said sleeve;
    a valve body integral with said armature for opening and closing said passage extending through said valve seat;
    a coil mounted in said frame for moving said armature to open and close said passage extending through said valve seat;
    a yoke mounted in said coil and closing the other end of said frame, wherein said yoke, said frame and said armature define a magnetic circuit, and wherein the protruding end of said frame is disposed between the inner periphery of said housing and the outer periphery of said sleeve and has an outer diameter substantially equal to the diameter of the inner periphery of said housing and an inner diameter substantially equal to the outer diameter of said sleeve, such that a gap is defined by the inner periphery of said housing, the outer periphery of said sleeve and said top end face of said protruding end of said frame; and
    a seal fitted in said gap.

2. The solenoid valve of claim 1, wherein said seal is a ring member disposed in said gap such that said gap is liquid tight.

3. The solenoid valve of claim 1, wherein an oil pressure chamber is defined by the inner periphery of said housing, said passage extending through said valve seat communicating with said oil pressure chamber and said housing including a second pressure fluid passage communicating with said oil pressure chamber.

* * * * *